United States Patent
Anandakumar et al.

(10) Patent No.: US 9,888,294 B2
(45) Date of Patent: *Feb. 6, 2018

(54) METHOD AND SYSTEM FOR RECEIVER CONFIGURATION BASED ON A PRIORI KNOWLEDGE OF NOISE

(71) Applicant: MaxLinear, Inc., Carlsbad, CA (US)

(72) Inventors: Anand Anandakumar, San Diego, CA (US); Ioannis Spyropoulos, La Jolla, CA (US); Meetul Parikh, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/616,397

(22) Filed: Feb. 6, 2015

(65) Prior Publication Data

US 2015/0156558 A1 Jun. 4, 2015

Related U.S. Application Data

(63) Continuation of application No. 13/916,130, filed on Jun. 12, 2013, now Pat. No. 8,990,864.

(60) Provisional application No. 61/658,457, filed on Jun. 12, 2012.

(51) Int. Cl.
*H04N 7/20* (2006.01)
*H04N 21/647* (2011.01)
*H04N 21/438* (2011.01)
*H04N 21/442* (2011.01)
*H04N 21/61* (2011.01)

(52) U.S. Cl.
CPC ..... *H04N 21/64738* (2013.01); *H04N 21/438* (2013.01); *H04N 21/44209* (2013.01); *H04N 21/6143* (2013.01)

(58) Field of Classification Search
CPC .......... H04N 21/64738; H04N 21/438; H04N 21/44209; H04N 21/6143
See application file for complete search history.

(56) References Cited

U.S. PATENT DOCUMENTS 6,229,480 B1 * 5/2001 Shintani ............... H01Q 1/1257
342/359
7,953,142 B2 * 5/2011 Chansarkar ............. G01S 19/29
327/141

(Continued)

*Primary Examiner* — Oschta Montoya
(74) *Attorney, Agent, or Firm* — McAndrews, Held & Malloy, Ltd.

(57) ABSTRACT

A signal receiver may be configured to determine when signal generation adjustments directed to particular components of signals received by the signal receiver, cause performance changes relating to effects of the signal generation adjustments on other components of the received signals. Operations of the signal receiver may then be controlled based on the performance changes, to mitigate at least some of the effects on the one or more other components of the signals. The performance changes may comprise amplitude glitches, phase glitches, and/or bit or packet errors. The signal generation adjustments may comprise channel-to-frequency re-assignment. Controlling operations of the signal receiver may comprise adjusting such parameters as amplification gain and/or tracking loop bandwidth, and/or determining whether (or not) to ignore bit/packet errors.

17 Claims, 6 Drawing Sheets

(56) References Cited

U.S. PATENT DOCUMENTS

| | | | | |
|---|---|---|---|---|
| 2002/0044570 A1* | 4/2002 | Gurusami | ............ | H04L 1/0057 |
| | | | | 370/487 |
| 2003/0009717 A1* | 1/2003 | Fukushima | ........... | H04L 1/1642 |
| | | | | 714/748 |
| 2005/0047533 A1* | 3/2005 | Ruelke | ................... | H03G 3/001 |
| | | | | 375/345 |
| 2008/0293370 A1* | 11/2008 | Wood | ................... | H03G 3/3068 |
| | | | | 455/250.1 |
| 2011/0016496 A1* | 1/2011 | Popa | ...................... | H04H 20/38 |
| | | | | 725/68 |
| 2013/0058439 A1* | 3/2013 | Lin | ....................... | H03M 1/186 |
| | | | | 375/340 |

* cited by examiner

METHOD AND SYSTEM FOR RECEIVER CONFIGURATION BASED ON A PRIORI KNOWLEDGE OF NOISE

CLAIM OF PRIORITY

This application is a continuation of U.S. patent application Ser. No. 13/916,130, filed Jun. 12, 2013, which in turn makes reference to, claims priority to and claims benefit from the U.S. Provisional Patent Application Ser. No. 61/658,457, filed on Jun. 12, 2012. Each of the above stated applications is hereby incorporated herein by reference in its entirety.

TECHNICAL FIELD

Aspects of the present application relate to communications. More specifically, certain implementations of the present disclosure relate to receiver configuration based on priori knowledge of noise.

BACKGROUND

Existing methods and systems for configuring or reconfiguring a receiver due to noise can be can be costly, cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for receiver configuration based on a priori knowledge of noise, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Certain implementations of the invention may be found in method and system for receiver configuration based on priori knowledge of noise. As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
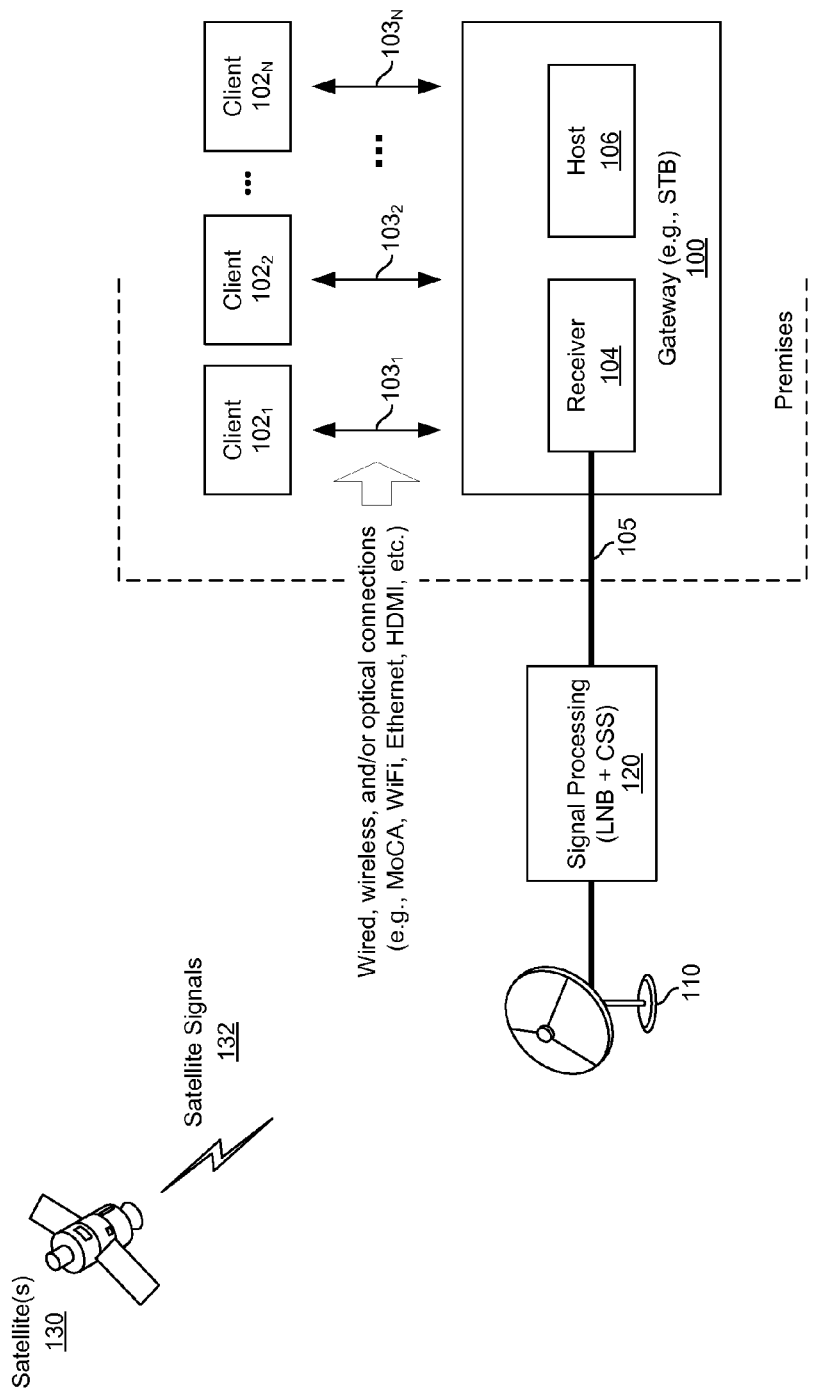
FIG. 1 illustrates an example satellite system comprising a receiver which is operable to be configured based on a priori knowledge of noise.

FIG. 1 illustrates an example satellite system comprising a receiver which is operable to be configured based on a priori knowledge of noise. Referring to FIG. 1, there is shown a gateway 100, a plurality of client devices $102_1$-$102_N$, a satellite reception assembly 110, a signal processing block 120, and a satellite 130.

The gateway 100 may comprise suitable circuitry, interfaces, logic, and/or code for providing and/or supporting various services or functions in a particular location (e.g., residential or commercial premises), such as to service a plurality of client devices (e.g., the client devices $102_1$-$102_N$) in that location. The services or functions that may be provided and/or supported by the gateway 100 may pertain to, for example, broadband access, broadcast/television access, content distribution, or the like. For example, the gateway 100 may be configured and/or may function as a satellite set-top box (STB), to support or enable satellite television access.

The client devices $102_1$-$102_N$, may comprise devices that may communicate with the gateway 100, via one or more point-to-point links (e.g., a plurality of links $103_1$-$103_N$). In this regard, the client devices $102_1$-$102_N$ may be operable to utilize services or functions provided by the gateway 100. For example, in instances where the gateway 100 is utilized to support broadband/television access and/or content distribution, the client devices $102_1$-$102_N$ may comprise televisions and similar devices that may be used in consuming (e.g., displaying or playing) content that may be broadcasted (e.g., via terrestrial signals, satellite signals, cable signals, and/or over the Internet) and received via the gateway 100. The disclosure is not limited, however, to any particular type of client device. The plurality of links $103_1$-$103_N$ may comprise wired, wireless, and/or optical links that may be suited for use in an environment such as the in-premises network 100. For example, the links $103_1$-$103_N$ may comprise wired connections (e.g., HDMI connections, Display Port links, Multimedia over Coax Alliance (MoCA) links, Ethernet connections, or the like), and/or wireless connections (e.g., Wi-Fi, ZigBee, wireless USB, or the like).

In operation, the gateway 100 may be configured to service the plurality of client devices $102_1$-$102_N$, such as to provide or enable broadcast (e.g., satellite, cable or terrestrial) access, broadband access, and/or content distribution related services. In this regard, the gateway 100 may be configured to support interactions with the client devices $102_1$-$102_N$ (e.g., via the links $103_1$-$103_N$) such as to facilitate distribution of data or content thereto, and/or to receive communications therefrom. For example, the gateway 100 may comprise a host 106, which may comprise circuitry configured for handling interactions with the client devices $102_1$-$102_N$. In this regard, communications from the client devices $102_1$-$102_N$ may comprise messages or data directed to the gateway 100 itself (e.g., requests for particular channels), or may be directed to remote systems with which the gateway 100 may communicate (as such, would only be routed through the gateway 100).

The gateway 100 may also be configured to support communication with remote systems (e.g., broadcast headends), such as in instances when the gateway 100 is utilized to provide particular services (e.g., broadband/television access, or other similar content broadcast/distribution services). For example, the gateway 100 may comprise a receiver 104, which may comprise circuitry configured for handling and/or supporting reception of signals originating from remote systems/sources (e.g., carrying broadcast content or other data). The remote systems may communicate (e.g., broadcast) using wired or wireless signals. For example, the gateway 100 may be configured to support (e.g., via the receiver 104) use of wired interfaces/media (and related standards/protocols) that may be utilized to facilitate remote communication over wired connections (e.g., from suitable remote sources, such as cable headends). For example, the gateway 100 may support use of coaxial or twisted-pair cables and/or an optical fibers, which may carry content from cable television head-end(s) or IP television head-end(s), such as in the form of physical layer symbols in accordance with, for example, DSL, DOCSIS, or Ethernet standards (e.g., to facilitate cable television, terrestrial television, and/or Internet access).

The gateway 100 may also be configured to support (e.g., via the receiver 104) use of wireless (or over-the-air) interfaces/media (and related standards/protocols) that may be utilized to facilitate remote communication over wireless connections (e.g., from suitable remote sources, such as satellite head-ends). In this regard, wireless based reception of broadcasts may necessitate, in some instances, use of local auxiliary devices or systems for enabling the wireless communication (reception) of signals, such antennas, satellite dishes or the like. For example, the gateway 100 may be configured and/or may function as a satellite set-top box (STB), to support or enable satellite television access. In this regard, the satellite reception assembly 110 may be utilized (e.g., installed on the roof of the premises) to enable satellite based communications (e.g., allow reception of satellite based broadcasts, and, in some instances, transmission of— i.e. uplink of, satellite communications). In this regard, the satellite 130 may be utilized to communicate satellite signals 132 (typically comprise only downlink communication signals, but the disclosure is not so limited). In this regard, the satellite signals 132 may be utilized to broadcast satellite television content. The satellite signals 132 may comprise, for example, K, Ka, and/or Ku band Direct Broadcast Satellite (DBS) signals. The disclosure, however, is not limited to any particular type of satellite signal. The satellite reception assembly 110 may be a satellite "dish" for example. In this regard, the satellite reception assembly 110 may comprise, for example, a signal reflector which may be used for capturing satellite signals (e.g., the satellite signals 132) and/or reflecting them into a particular point (e.g., focal point of the dish).

In some instances, reception of signals, such as the satellite signals 132, may require or entail use of addition circuitry, such as the signal processing block 120, which may be utilized during reception of signals and/or handling of the received signals before forwarding the signals (or corresponding output) to other devices (e.g., the gateway 100). In this regard, the signal processing block 120 may be configured to handle reception of particular signals (e.g., satellite signal captured via satellite dish), and/or to perform (at least a portion of) processing of the received signals— e.g., to convert signals (from RF to IF), to recover data carried in the received signals (e.g., television channels, media content, etc.), and to configure a suitable output corresponding to the recovered data for transmission to other devices that may handle use and/or distribution of the data (e.g., to generate signals suitable for transmission to the gateway 100, via a link 105). For example, in instances where the received signals constitute satellite signals, the signal processing block 120 may correspond to (or incorporate) low-noise block downconverter (LNB). The link 105 may comprise one or more wired, wireless, and/or optical links. For example, the link 105 may comprise a wired (e.g., coaxial and/or twisted-pair) and/or wireless communication medium which carries physical layer symbols in accordance with, for example, Multimedia over Coax Alliance (MoCA), Ethernet, and/or DBS standards.

Once signals originating from the remote systems (or signals corresponding thereto—e.g., signals generated by signal processing block 120 and communicated over the link 105) are received by the gateway 100 (e.g., via the receiver 104), the gateway 100 may be configured to facilitate and/or handle reception and/or transmission of signals that may be used for content distribution and/or broadband accessibility (e.g., to the plurality of client devices $102_1$-$102_N$). For example, the gateway 100 may communicate received content (or portions thereof) to the client devices $102_1$-$102_N$ using the links $103_1$-$103_N$.

In some instances, handling of received signals may incorporate use of channel stacking. In this regard, in a channel-stacked architecture, content (e.g., channels) from multiple inputs (e.g., multiple satellite signals) may be combined onto a single output (e.g., signals communicated over link 105 to the gateway 100). For example, a channel stacking switch (CSS) (which may be collocated with the satellite dish 110, and/or the low-noise block downconverter (LNB) in the signal processing block 120) may be utilized to select a portion of available/received content (e.g., a subset of all available satellite channels) for output to devices served by the CSS (e.g., the gateway 100). In this regard, the selected channels may then be multiplexed onto one or more IF outputs (e.g., over the link 105) that go to gateway 100.

Selecting channels for inclusion/exclusion in the output (of the CSS of the signal processing block signal processing block 120) to the gateway 100 may be based on various parameters and/or criteria. For example, determining channels that may be in the subset of channels selected for the IF output(s) and/or which may be assigned to particular IF frequencies may depend on the channels that are (and/or have been or will be) consumed by user(s), such as via one or more of the client devices $102_1$-$102_N$, connected to the gateway 100 (e.g., based on user input/selection, and/or tracking of prior user interactions). Therefore, if a user changes to a channel ("CH. X") that is not currently being multiplexed onto the IF output(s), the CSS may need to add "CH. X" to the IF output (and, in some instances, make additional changes—e.g., dropping CH. Y to make room for CH. X).

In some instances, the gateway 100 or components thereof may be configured (or reconfigured) due to changes affecting the signals being sent to the gateway 100. For example, when channels are modified (e.g., by the CSS of the signal processing block 120), the receiver 104 of the gateway 100 may be reconfigured or adjusted based on and/or to account for the changes being made by the CSS—e.g., frequency reassignment(s) in the IF output(s) as result of adding and/or dropping of particular channels. In this regard, the gateway 100 may be configured to handle the new output (tune to the channel(s) added/modified, and/or detune dropped channel(s)). In various implementations in accordance with the present disclosure, the gateway 100 may also be configured to account for the transitions during the changes. In this regard, the gateway 100 (or components thereof, such as the receiver 104) may particularly be configured or adjusted to account for various glitches, errors, changes in performance or similar issues that may occur as result of the changes being made (e.g., channel changes), during the transitions (e.g., from original channel lineup to modified/adjusted channel lineup).

Figure 3:
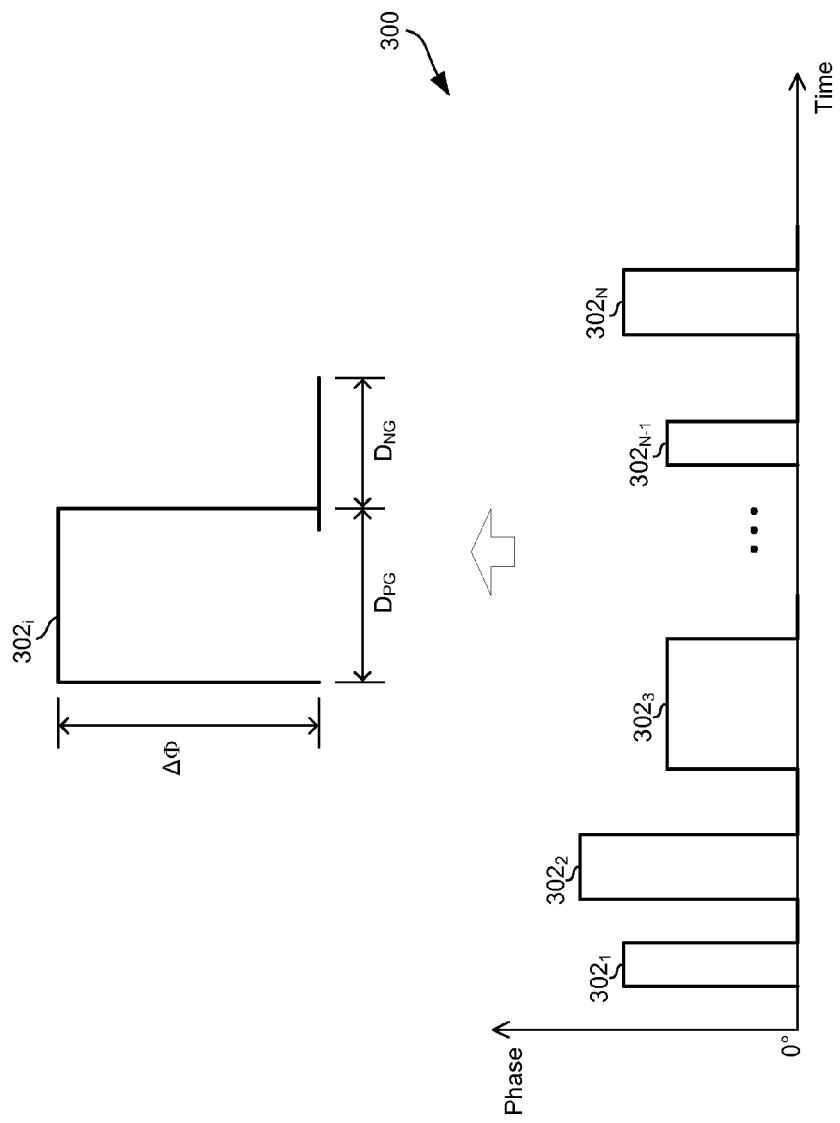
FIG. 3 illustrates example phase glitches which may result from a frequency reassignment in a channel stacking switch.
Figure 4:
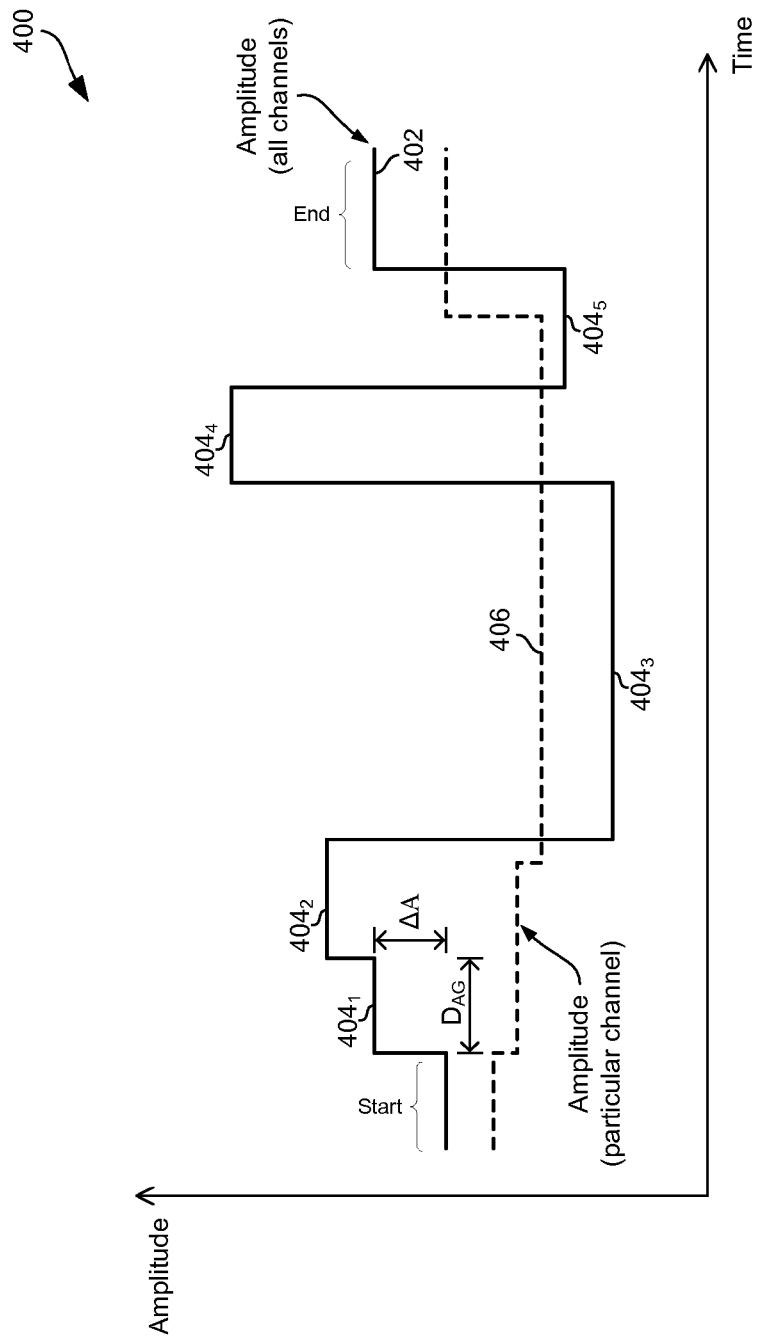
FIG. 4 illustrates example amplitude glitches which may result from a frequency reassignment in a channel stacking switch.

For example, the change of which channels are assigned to the IF output(s) of the CSS may result in glitches on unchanged channels (i.e. channels multiplexed onto the IF output(s) before, during, and after the frequency reassignment). These glitches on the unchanged channels may appear as phase and/or amplitude discontinuities in the signal. To mitigate the impact that these glitches may have on user experience, components of gateway 100 may be configured based on knowledge of channel changes requested/initiated by clients connected to the gateway 100. In this regard, one or more of the components operating in a first configuration may be configured into a second configuration around or during the time at which a frequency reassignment is occurring in the CSS. FIGS. 3 and 4 describe examples of phase glitches and amplitude glitches, respectively, which may occur during, for example, channel changes (frequency reassignment).

In an example implementation, the gateway 100 (and/or particular components thereof, such as the receiver 104) may support configuration based on a priori knowledge (e.g., of noise, glitches, errors and the like). In this regard, the gateway 100 may be configured to trigger changes (e.g., channel changes) and/or to anticipate possible transition related issues (and as such, to preemptively account for expected issues—e.g., glitches). For example, the host 106 of gateway 100 may receive a request from a client device 102$_i$ currently consuming CH. Y, indicating that another channel (CH. X) is being selected or requested. The host 106, which may know which channels are currently available in the IF outputs from the CSS, may determine that the request channel CH. X is not one of those channels (i.e. not available). Consequently, the host 106 may determine (based on the request) that the CSS would have to make a change (e.g., perform channel-to-frequency reassignment, such as in order to provide the requested channel CH. X), and, in some instances, may trigger the necessary change (frequency reassignment) in the CSS. For example, the frequency re-assignment may be triggered by a message from gateway 100 to the CSS (e.g., using digital satellite equipment control (DiSEqC)). Furthermore, the host 106 may notify the receiver 104 of the pending anticipated frequency reassignment, such that one or more components of the receiver 104 can be configured (or reconfigured from a first configuration, which may correspond to normal receiving operations) into a second configuration, for use during the period in which the frequency reassignment is taking place. In this regard, the receiver 104 (or component(s) thereof) may be configured to account for any anticipated issues during the transition (i.e. during the frequency reassignment). Once the frequency reassignment is complete, the one or more components can return to the first configuration.

Figure 2:
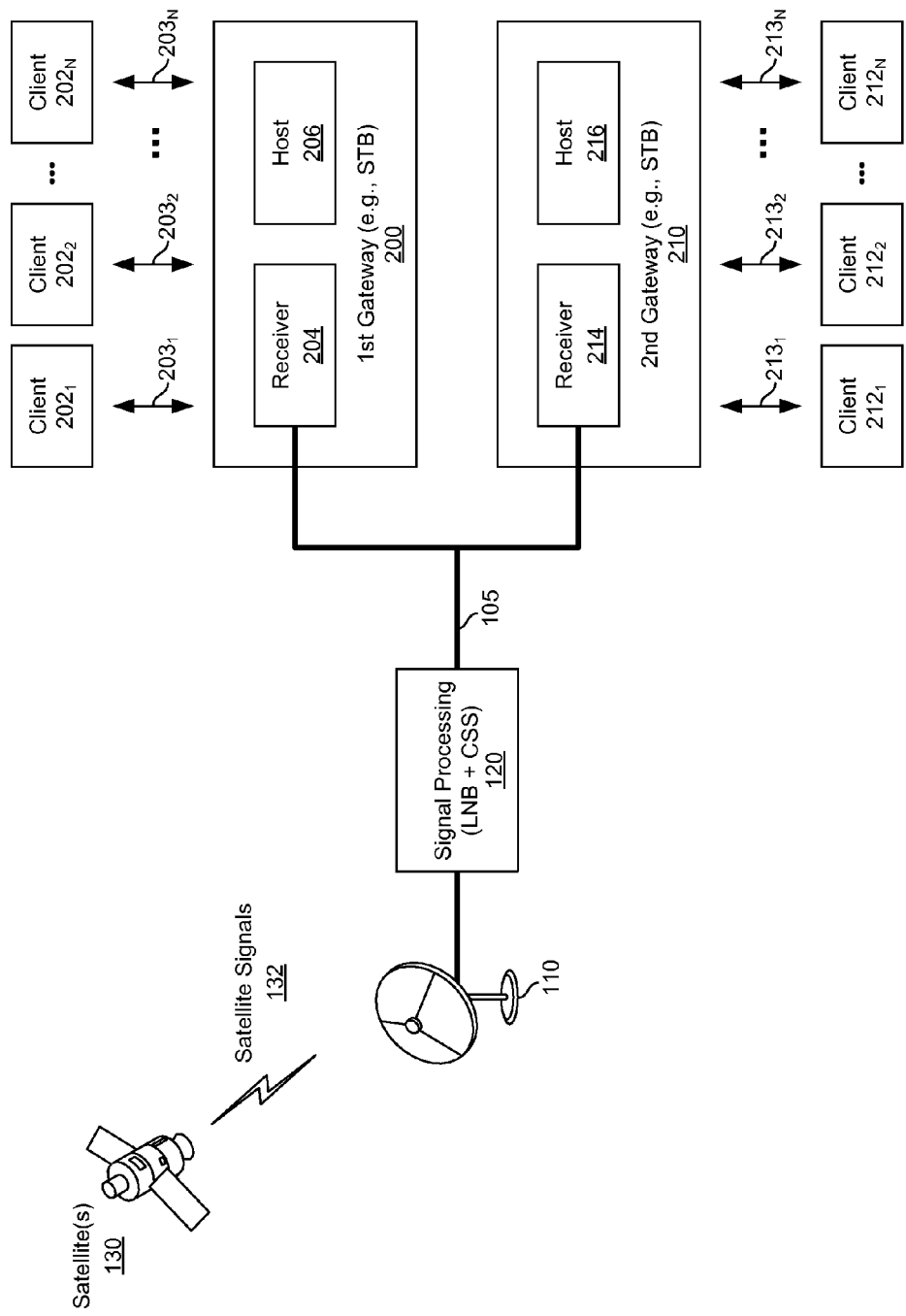
FIG. 2 illustrates an example satellite system comprising multiple receivers which are operable to be configured based on a priori knowledge of noise.

FIG. 2 illustrates an example satellite system comprising multiple receivers which are operable to configure based on a priori knowledge of noise. Referring to FIG. 2, there is shown two gateways 200 and 210, client devices 202$_1$-202$_N$ and 212$_1$-212$_M$. Also shown in FIG. 2, are the satellite reception assembly 110, the signal processing block 120, and the satellite 130 of FIG. 1.

Each of the gateways 200 and 210 may be substantially similar to the gateway 100, as described with respect to FIG. 1, for example. In this regard, each of the gateways 200 and 210 may be configured to service one of the pluralities of client devices 202$_1$-202$_N$ and 212$_1$-212$_M$, respectively, substantially in a similar manner as that described with respect to the gateway 100 and the plurality of client devices 102$_1$-102$_N$ in FIG. 1. For example, the gateways 200 and 210 may comprise receivers 204 and 214 (each of which similar to, e.g., the receiver 104 of FIG. 1) and hosts 206 and 216 (each of which similar to, e.g., the host 106 of FIG. 1), which may be utilized in enabling reception of signals (e.g., from remote sources) and/or facilitating interactions with serviced client devices.

In operation, each of the gateways 200 and 210 may be configured to service client devices (e.g., client devices 202$_1$-202$_N$ and 212$_1$-212$_M$, respectively) such as to provide or enable broadcast (e.g., satellite, cable or terrestrial) access, broadband access, and/or content distribution related services. In this regard, the each of the gateways 200 and 210 may operate similarly to, for example, the gateway 100 of FIG. 1. For example, each of the gateways 200 and 210 may be configured as a satellite STB, and may be used in similar manner to facilitate reception of satellite signals, and/or extraction of content therefrom (e.g., channels) that may be provided to particular client devices.

In some instances, as with the gateway 100 of FIG. 1, each of the gateways 200 and 210 may support configuration (or reconfiguration) in certain instances, such as during particular changes (e.g., channel changes). In this regard, as with the gateway 100 of FIG. 1, each of the gateways 200 and 210 may be operable to trigger changes (e.g., in the CSS of the signal processing block 120), and/or to effectuate reconfiguration (e.g., of receivers 204 and 214) based on anticipated issues during transitions. In addition, however, in some instances, (re)configuration of one of the gateways may relate to, and/or be caused by changes triggered (or caused) by the other gateway. In this regard, because of particular setup in which the multiple gateways may share some resources used in the signal reception (e.g., the satellite reception assembly 110 and the signal processing block 120), a change triggered by one of the gateways 204 and 214 may necessitate adjustment(s) to the shared resources in a manner that would require a configuration in the other gateway, in order to continue receiving signals.

For example, the client device 212$_1$ may be consuming CH. Y but may send (e.g., based on user input or channel selection) a channel change request to gateway 210 (via host 216 thereof) requesting channel CH. X. The gateway 210 may (e.g., via a look-up table) determine that CH. X is not currently included the IF output(s) from the CSS. Accordingly, the host 216 may trigger reconfiguration of the receiver 214 during the upcoming frequency reassignment. In addition, a reconfiguration may also be performed in the other gateway (e.g., gateway 200). Triggering the reconfiguration of other gateways (i.e., ones not initiating the change) may be done in different manners. In an example implementation, the gateways (200 and 214) may be configured to communicate (directly, or indirectly—e.g., via the CSS), such that a gateway triggering a change may be able to communicate with the other gateway to inform the other gateway of a channel change (e.g., of a request that is going to trigger a frequency reassignment in the CSS), to trigger any required reconfiguration therein. Accordingly, the host 216 may additionally send a notification of the channel change and/or the pending frequency reassignment to the host 206, so that the host 206 can trigger reconfiguration of the receiver 204 as well during the upcoming frequency reassignment.

Alternatively, in another implementation, a gateway may be configured to determine when changes are being triggered or caused by another gateway. For instance, in the previous example, rather than having the host 216 send a notification to host 206, the gateway 200 may simply determine (e.g., by sniffing communications between gateway 210 and the CSS) that a frequency reassignment is forthcoming based on the sniffed communication, and may reconfigure receiver 204 accordingly during the frequency reassignment.

FIG. 3 illustrates example phase glitches which may result from a frequency reassignment in a channel stacking switch. Referring to FIG. 3, there is shown a phase profile 300.

The phase profile 300 may correspond to phase (and changes thereto) of a particular received signal of a receiver, such as the receiver 104 of FIG. 1 and/or the receiver(s) 204 and 214 of FIG. 2. In this regard, amplitude profile 400 may correspond to the amplitude of a signal (e.g., carrier signal) received by the receiver, including during normal operations and/or reconfiguration of the receiver The phase profile 300 may correspond to phase error(s) that may occur in a receiver, such as, for example, the receiver 104 of FIG. 1 and/or the receiver(s) 204 and 214 of FIG. 2. In this regard, the phase profile 300 may correspond to the phase errors (glitches) occurring during (and as result of) reconfiguration of the receiver. For example, the phase profile 300 may comprise a series of phase glitches $302_1$-$302_N$, which may occur during, for example, frequency reassignment of the receiver. Each phase glitch $302_i$ may be characterized using such parameters as the phase change (corresponding to phase change during the phase glitch) $\Delta\Phi$, duration (time) of phase glitch $D_{PG}$, and duration (time) before next phase change/glitch $D_{NG}$. In some instances, the phase glitches $302_1$-$302_N$ may be identical (i.e. phase error $\Delta\Phi$, duration of phase error $D_{PG}$, and duration before next phase glitch $D_{NG}$ for each glitch may be the same). In most instances, however, the parameters may differ from glitch to another (as shown in FIG. 3). In other words, the phase change $\Delta\Phi$, the duration of phase glitch $D_{PG}$, and/or the duration before next phase change/glitch $D_{NG}$ duration associated with each glitch may differ from other glitches. Furthermore, while the phase glitches are shown in FIG. 3 as square/step adjustments/changes, the disclosure is not so limited. Accordingly, the phase glitches in particular phase profile may have one of many different shapes (e.g., step, exponential, or any other arbitrary shape).

FIG. 4 illustrates example amplitude glitches which may result from a frequency reassignment in a channel stacking switch. Referring to FIG. 4, there is shown an amplitude profile 400.

The amplitude profile 400 may correspond to amplitude (and changes thereto) of a particular received signal of a receiver, such as, for example, the receiver 104 of FIG. 1 and/or the receiver(s) 204 and 214 of FIG. 2. In this regard, amplitude profile 400 may correspond to the amplitude of signal (e.g., carrier signal) received by the receiver, including during normal operations and/or reconfiguration of the receiver. As shown in FIG. 4, the amplitude profile 400 may comprise an aggregate total amplitude 402, which may represent the total amplitude (e.g., power) corresponding to all channels in a received signal. In addition, the amplitude profile 400 may also comprise amplitude graphs corresponding to particular channels—e.g., amplitude graph 406 corresponding to amplitude of a particular channel in the received signal. During reconfiguration of the receiver, amplitude glitches may occur as a result of the reconfiguration (e.g., frequency re-assignment, corresponding to channel changes). For example, as shown in FIG. 4, between start and end (levels) of particular reconfiguration of the receiver, a plurality of amplitude glitches $404_i$ (e.g., amplitude glitches $404_1$-$404_5$) may be occur. In this regard, each amplitude glitch $404_i$ may be characterized using such parameters as the amplitude change (representing change in amplitude during the glitch) $\Delta A$, and duration (time) $D_{AG}$ (representing duration of the glitch). In most instances, the amplitude glitches $404_i$ may differ from one glitch to another (as shown in FIG. 4)—i.e. the amplitude change $\Delta A$ (value and sign) and duration of amplitude glitch $D_{AG}$ (value) may vary from one glitch to another (as shown in FIG. 4). Furthermore, while the amplitude changes are shown in FIG. 4 as square/step adjustments/changes, the disclosure is not so limited. Accordingly, the amplitude changes in particular amplitude profile may have one of many different shapes (e.g., step, exponential, or any other arbitrary shape).

Figure 5:
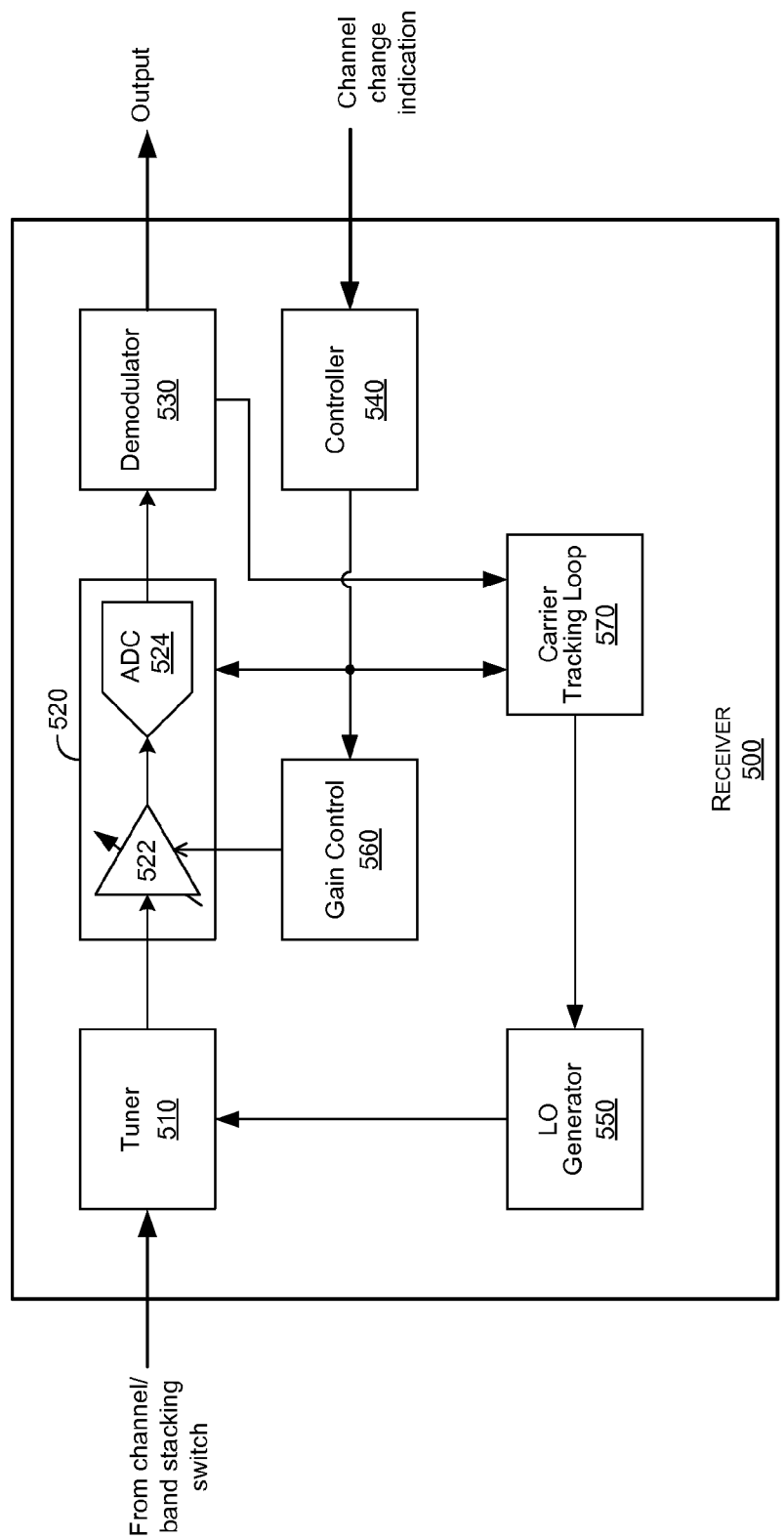
FIG. 5 illustrates an example receiver that may be reconfigurable based on a priori knowledge of noise.

FIG. 5 illustrates an example receiver that may be reconfigurable based on a priori knowledge of noise. Referring to FIG. 5, there is shown a receiver 500.

The receiver 500 may comprise suitable circuitry, interfaces, logic, and/or code for receiving and/or processing signals—e.g., signals carrying content or information (e.g., satellite signals). The receiver 500 may correspond to, for example, the receiver 104 of FIG. 1 and/or the receiver(s) 204 and 214 of FIG. 2. In this regard, the receiver 500 may be operable to support re-configurability based on a priori knowledge (e.g., of noise, glitches, errors and the like). For example, the receiver 500 may comprise a tuner 510, an input processing block 520, a demodulator 530, a controller 540, a local oscillator (LO) generator 550, a gain control block 560, and a carrier tracking loop (CTL) block 570.

The tuner 510 may comprise circuitry for performing tuning. In this regard, the tuner 510 may be configured for receiving particular radio frequency (RF) signals (e.g., corresponding to a particular carrier frequency) of particular associated bandwidth, and to convert the received signals to corresponding (e.g., intermediate frequency or IF) signals having a particular fixed frequency that is suitable for further processing. The tuner 510 may be operable to support tuning to wide frequency bandwidth, which may allow for reception of signals having several subcarriers. The tuner 510 may configured to tune, electronically, across a large portion of the radio frequency spectrum, such as by the application (and/or adjustment) of a voltage.

The input processing block 520 may comprise circuitry for processing received signals, such as to make the signals suitable demodulation (to facilitate extraction of content carried thereby). For example, the input processing block 520 may be operable to perform amplification (e.g., low-noise amplification) via a variable amplifier 522 and analog-to-digital conversion via an analog-to-digital convertor (ADC) 524. In some implementations, however, sampling may be performed directly in the tuner 510. For example, in instances where the tuner 510 is implemented as a full-spectrum-capture (FSC) tuner, the entire received band may be sampled using a high speed ADC and individual channels can then be selected digitally using digital down-converters and digital filtering (in the input processing block 520).

The demodulator 530 may comprise circuitry for performing demodulation processing—e.g., to extract original data (e.g., content) bearing signals from modulated carrier waves. In this regard, the demodulation performed by the demodulator 530 may be configured in accordance with a particular broadcast/communication standard (e.g., a satellite standard/protocol, such as DVB-S) associated with the received signals.

The controller 540 may comprise circuitry for controlling operations of at least some of the components of the receiver 500. In this regard, the controller 540 may be configured to generate control signals, which may be utilized in controlling (or adjusting) operations of one or more other components, of the receiver 500. In various implementations, the controller 540 may be particularly configured to control configuration (or reconfiguration) of the receiver 500 during transition periods (i.e., corresponding to changes affecting signals received by the receiver 500). In this regard, the controller 540 may be operable to determine when signal generation changes affecting signals being received by the signal receiver cause glitches, errors, or the like; and may determine modifications or adjustments to one or more components of the receiver 500 (e.g., the amplifier 522, the ADC 524, the gain control block 560, and/or the CTL block 570), which may be necessary to prevent or mitigate these glitches/errors. In some instances, determining the modifications or adjustments may require determining, by the controller 540 for example, characteristics of glitches/errors (e.g., type, amount, duration, etc.).

The LO generator 550 may comprise circuitry for generating local signals having particular characteristics (e.g., frequency, amplitude and/or phase), which may be used during signal processing operations—e.g., to convert frequency of received signals to a different frequency.

The gain control block 560 may comprise circuitry for controlling and/or adjusting gains, such as amplification gains. For example, the gain control block 560 may be operable to control and/or adjust the gain of the amplifier 522.

The CTL block 570 may comprise circuitry for performing carrier tracking, and phase recovery, such as for carrier signals used to carrying satellite content. In this regard, the CTL block 570 may utilize phase-locked loop based implementation, and may be configured to estimate and/or compensate for phase differences between a received signal carrier waves and the local oscillator (e.g., LO generator 550) of the receiver 500, such as, for example, for purpose of coherent demodulation. In some instances, the carrier tracking may be configured differently. For example, in an example implementation, the carrier tracking may be estimated in the demodulator 530, and may also be corrected in the demodulator 530 itself, such as using a numerically-controlled-oscillator (NCO) and/or a digital phase rotator.

In operation, the receiver 500 may be utilized in handling and/or supporting reception of signals, such as signals originating from remote systems/sources (e.g., carrying broadcast content or other data), and/or signals generated based thereon (e.g., signals generated by a CSS, such as the CSS of the signal processing block 120). For example, the receiver 500 may be incorporated into a gateway that may be used to facilitate reception of broadcast signals (e.g., satellite signals) and distributing data (e.g., content) carried thereby.

In some instances, the receiver 500 may be configured to support utilizing different configurations, including, for example, normal mode/operations configuration(s) and transition configuration, which may be applied to the receiver 500 during transitions periods occurring during changes (e.g., frequency reassignment triggered by channel changes). In this regard, in various implementations, one or more components of the receiver 500 may to be reconfigured during frequency reassignment, such as, for example, to account for and/or mitigate anticipate glitches, errors, or other performance changes. For example, one component that may be reconfigured during frequency reassignment is the amplifier 522 feeding the ADC 524. In an example implementation, during the frequency reassignment period, a gain of the amplifier 522 may be adjusted, such as, for example, to prevent amplitude glitches from causing a signal to clip. For example, the gain of the amplifier 522 may be nominally G before and after the frequency reassignment but may be nominally $G+\Delta_G$ during the frequency reassignment. In this regard, the controller 550 may determine and/or provide to the gain control block 560 the predicted glitch characteristics (or information/parameters related thereto), and the gain control block 560 may then determine the gain adjustment ($\Delta_G$) utilized during the frequency reassignment. In some instances, preventing (or accounting) for amplitude glitches may be achieved by directly modifying or adjusting operation of the ADC 524 (solely or in conjunction with adjusting gain of the amplifier 522 as described above). For example, automatic gain control (AGC) set points that may be used in the ADC 524 may be adjusted (e.g., lowered), during transition periods, to prevent and/or mitigate anticipated amplitude glitches.

Another component that may be reconfigured during frequency reassignment is CTL block 570. In this regard, a bandwidth of the CTL block 570, for example, may be increased during the frequency reassignment period. For example, the bandwidth of the CTL block 570 may be set to a particular value, BW, before and after the frequency reassignment, but may be set/adjusted (e.g., to $BW+\Delta_{BW}$) after the frequency reassignment. In this regard, the CTL block 570 may determine the bandwidth adjustment ($\Delta_{BW}$) utilized during the frequency reassignment, for example, based on control data provided by the controller 550 (e.g., information and/or parameter related to predicted glitches).

Reconfiguration of the receiver during transition periods may also comprise simply not doing something that is normally done by the receiver 500 and/or components thereof. For example, a transition configuration may comprise configuring the receiver 500 not to reacquire even when packet/bit errors are detected. In this regard, the receiver 500 may typically be configured (in normal operation configuration) to reacquire if particular error rates are detected for a particular duration. Because the transition may last longer than the typical reacquiring triggering (error) detection duration, the reacquiring may be disabled during transition period under certain conditions, such as if tracking loops remain locked.

In some instances, reconfiguration of receiver components may additionally or alternatively be triggered in response to sources of noise other than frequency reassignment. For example, where a WiFi or MoCA transceiver is part of, or otherwise communicatively coupled to, an STB, the STB may detect or be notified of pending transmissions by the WiFi or MoCA radio which may result in glitches. Accordingly, a receiver of the STB (e.g., the receiver 500) can be reconfigured during the WiFi or MoCA transmissions.

Figure 6:
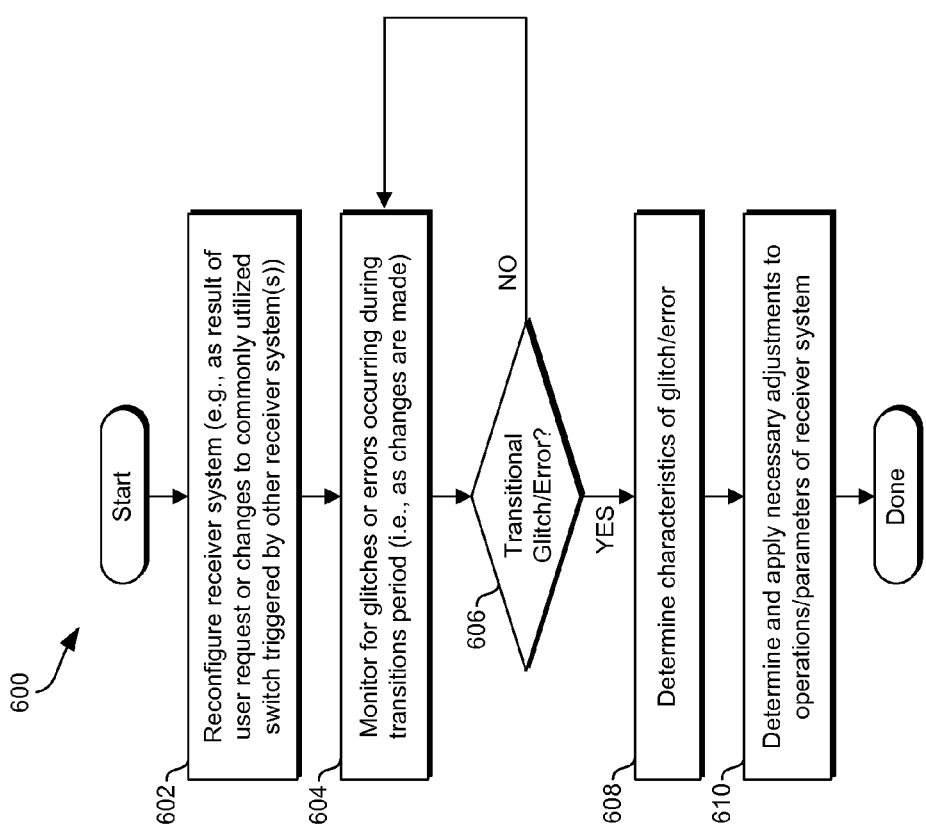
FIG. 6 is a flow chart that illustrates example reception and combination of satellite and non-satellite contents for a seamless user experience.

FIG. 6 is a flow chart that illustrates example reception and combination of satellite and non-satellite contents for a seamless user experience. Referring to FIG. 6, there is shown a flow chart 600 comprising a plurality of example steps that may be performed in a receiver system that receives and process signals (e.g., the signal receiver 500).

In step 602, the receiver system may be reconfigured during a transition period corresponding to changes being made that affect signals received by the receiver signal system. For example, the changes being made may comprise channel changes, which may require channel-to-frequency reassignment (e.g., in a channel stacking switch (CSS)). The changes affecting the signal received by the receiver signal system may be triggered as result of a user request sent to a device (e.g., STB) that comprises the receiver system. Alternatively, the changes may occur in a commonly utilized system (e.g., the CSS), being triggered by other receiver system(s), for example. In step 604, the receiver system may monitor or track for glitches or errors that may occur during the transition periods (i.e. while the changes are being made). In step 606, it may be determined whether any detected glitch/error is related to the transitions (rather than being normal/non-transitional related glitch error). In instances where it may be determined that the glitch/error is not related to the transitions, the process may loop back to 604. While not show in flow chart 600, the receiver system may handle that non-transitional glitch/error before returning to step 604.

Returning to step 606, in instances where it may be determined that the glitch/error is related to the transitions, the process may loop back to 608. In step 608, characteristics of the transitional glitch/error may be determined. In this regard, examples of glitch/error characteristics may comprise type of glitch (e.g., amplitude, phase, bit/packet error, etc.), measurement parameters (e.g., amount, such as phase change or amplitude increase/decrease, or bit/packet error rate; duration/time, such as duration of phase shift, duration of amplitude change, separation between consecutive glitches, duration of bit/packet errors, etc.), etc. In step 610, any adjustments to prevent or mitigate the transitional glitch/error, may be determined (e.g., based on the characteristics of the transitional glitch/error as determined in step 608), and these adjustments may then be applied to operations/parameters of receiver system (e.g., as described with respect to the receiver 500 of FIG. 5). In some instances, the process may be further simplified by having the host (e.g., host 106 of FIG. 1, host 206 or 216 of FIG. 2) communicate to the receiver (e.g., receiver 500) information related to the transition (e.g., start time, end time, and/or duration of the transition periods), and the receiver may simply then switch between using one configuration for use during normal operation and another configuration for use during transition period.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for receiver configuration based on priori knowledge of noise.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A system, comprising:
one or more circuits in a signal receiver, the one or more circuits are operable to:
   determine signal generation adjustments directed to one or more components of signals generated by the signal receiver;
   determine when application of the signal generation adjustments causes performance changes that have undesired effects on one or more other components of the signals generated by the signal receiver, wherein the one or more other components are intended to remain unchanged when said signal generation adjustments are applied; and
   control operations of the signal receiver based on said performance changes, wherein:
      the controlling is configured to mitigate at least some of the effects on the one or more other components of the signals when said signal generation adjustments are applied;
      the controlling comprises ignoring bit or packet errors occurring during said signal generation adjustments, the signal receiver being operable to otherwise handle bit or packet error by reacquiring input signals; and the bit or packet errors occurring during said signal generation adjustments are ignored based on a determination that tracking loops used in the signal receiver remain locked.

2. The system of claim 1, wherein said signal generation adjustments comprise frequency re-assignment.

3. The system of claim 1, wherein said performance changes comprise one or more of amplitude glitches, phase glitches, and bit or packet errors.

4. The system of claim 1, wherein said control of operations of the signal receiver comprises adjusting one or more parameters used during signal processing in the signal receiver.

5. The system of claim 4, wherein said one or more parameters used during signal processing in the signal receiver comprise amplification gain and/or tracking loop bandwidth.

6. The system of claim 1, wherein the signal receiver is operable to receive and process satellite signals captured via a satellite reception assembly.

7. The system of claim 1, wherein the signal receiver is operable to handled channel-stacked signals.

8. A method, comprising:
in a signal receiver:
determining signal generation adjustments directed to one or more components of signals generated by the signal receiver;
determining when application of the signal generation adjustments causes performance changes that have undesired effects on one or more other components of the signals received by the signal receiver, wherein the one or more other components are intended to remain unchanged when said signal generation adjustments are applied; and
controlling operations of the signal receiver based on said performance changes, wherein the controlling is configured to mitigate at least some of the effects on the one or more other components of the signals when said signal generation adjustments are applied; wherein:
said controlling comprises ignoring bit or packet errors occurring during said signal generation adjustments, wherein such bit or packet errors are handled otherwise by reacquiring input signals; and
ignoring said bit or packet errors occurring during said signal generation adjustments is based on a determination that tracking loops used in the signal receiver remain locked.

9. The method of claim 8, wherein said signal generation adjustments comprise frequency re-assignment.

10. The method of claim 8, wherein said performance changes comprise one or more of amplitude glitches, phase glitches, and bit or packet errors.

11. The method of claim 8, wherein said controlling of operations of the signal receiver comprises adjusting one or more parameters used during signal processing in the signal receiver.

12. The method of claim 11, wherein said one or more parameters used during signal processing in the signal receiver comprise amplification gain and/or tracking loop bandwidth.

13. A system, comprising:
a signal receiver that comprises:
signal processing circuitry that is operable to process signals, the signal processing circuitry comprising a tuner circuit, an amplifier circuit, an analog-to-digital convertor (ADC) circuit, and a demodulator circuit; and
controller circuitry that is operable to:
determine signal generation adjustments directed to one or more components of signals generated by the signal receiver;
determine when application of the signal generation adjustments causes performance changes that have undesired effects on one or more other components of the signals generated by the signal receiver, wherein the one or more other components are intended to remain unchanged when said signal generation adjustments are applied; and
control operations of the signal receiver based on said performance changes, wherein the controlling is configured to mitigate at least some of the effects on the one or more other components of the signals when said signal generation adjustments are applied; wherein said controlling comprises:
determining when bit or packet errors occur during said signal generation adjustments; and
ignoring the bit or packet errors based on a determination that tracking loops used in the signal receiver remain locked, the signal receiver being configured to otherwise handle bit or packet error by reacquiring input signals.

14. The system of claim 13, wherein said performance changes comprise one or more of amplitude glitches, phase glitches, and bit or packet errors.

15. The system of claim 13, wherein:
the signal receiver comprises a gain controller circuit; and
the controlling of operations of the signal receiver comprises adjusting gain parameters generated by the gain controller circuit, wherein at least one of the gain parameters is applied to the amplifier circuit.

16. The system of claim 13, wherein:
the signal receiver comprises a carrier tracking loop (CTL) circuit; and
the controlling of operations of the signal receiver comprises adjusting tracking bandwidth utilized by the CTL circuit.

17. The system of claim 13, wherein said controlling of operations of the signal receiver comprises adjusting set points applied to the ADC circuit.

* * * * *